Oct. 19, 1926.
E. A. DOW
1,603,455
VALVE
Filed March 7, 1923     2 Sheets-Sheet 1
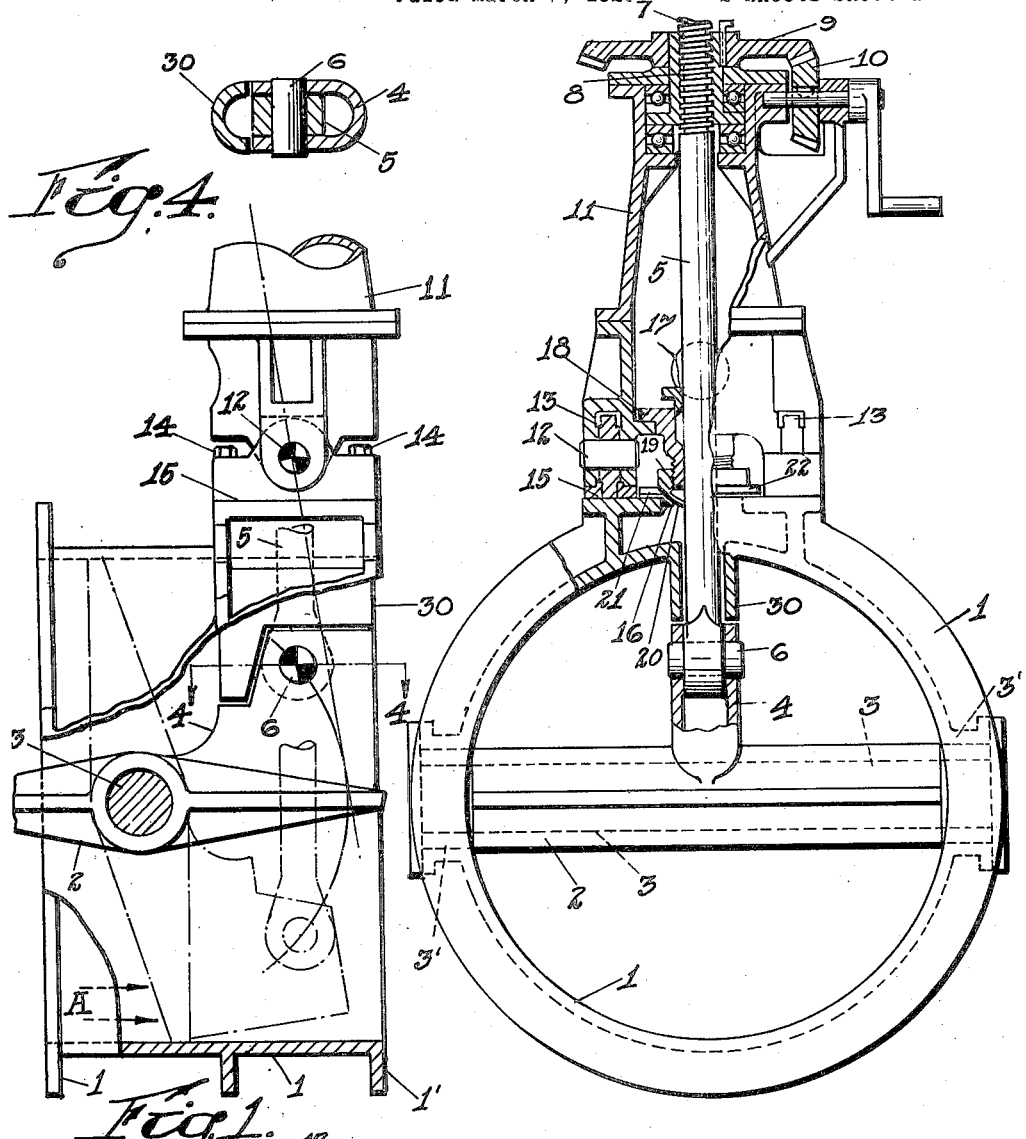
INVENTOR
Edwin A. Dow
BY
Geo. H. Kennedy Jr.
ATTORNEY

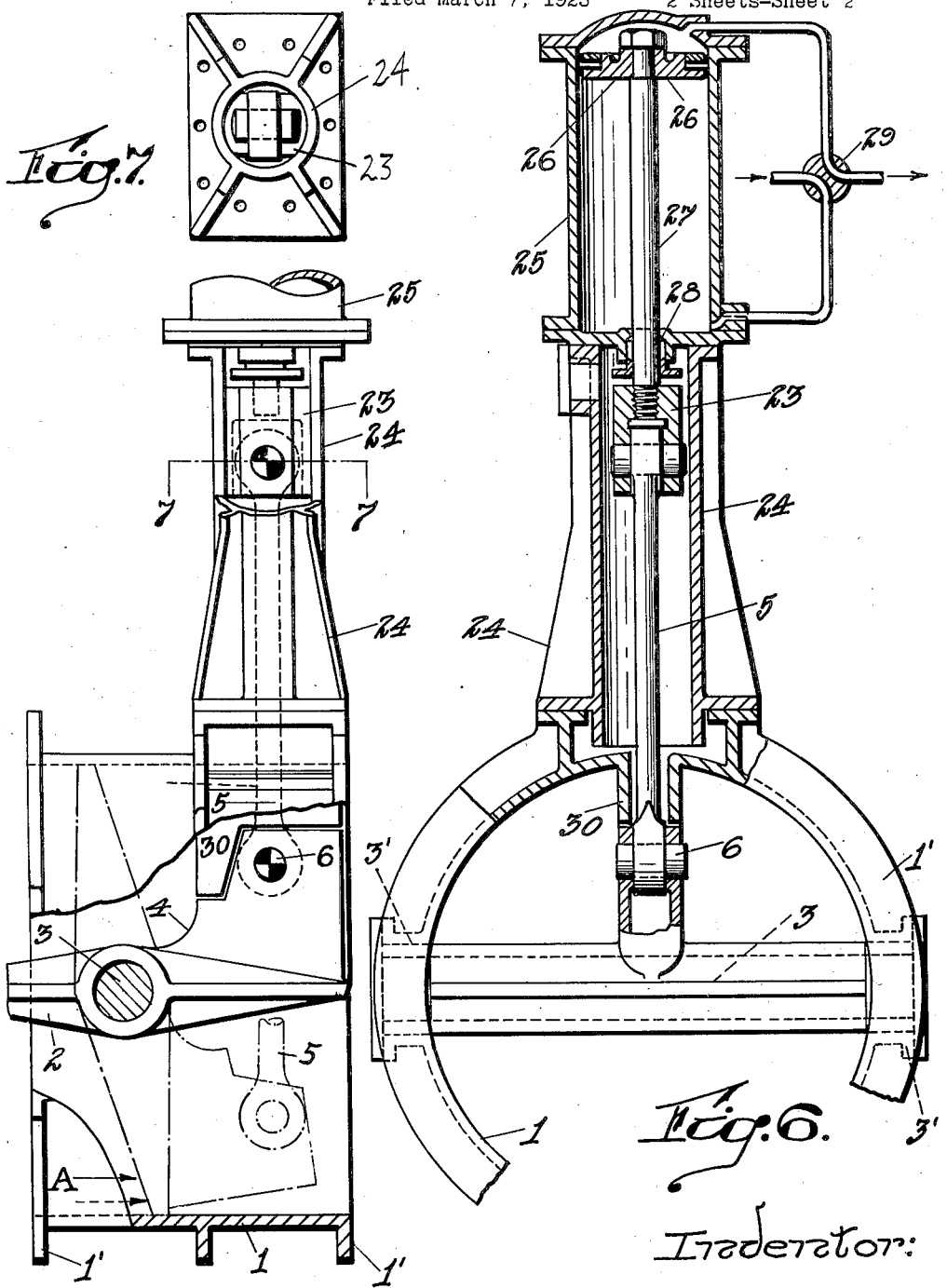

Patented Oct. 19, 1926.

1,603,455

UNITED STATES PATENT OFFICE.

EDWIN A. DOW, OF WORCESTER, MASSACHUSETTS.

VALVE.

Application filed March 7, 1923. Serial No. 623,421.

The present invention relates to butterfly or pivoted disk valves of the type used, for example, in large conduits or pipes to control the flow of a fluid, such as water, under pressure. The invention resides particularly in certain novel and improved means employed for the operation and movement of valves of this class,—the present application, as to subject matter, being a continuation, in part, of my copending application Serial No. 578,821, filed July 31, 1922. According to the invention, all of the advantages of simplicity, economy, compactness and low-head loss characteristic of ordinary butterfly valves are retained, with added advantages of strength, reliability and tightness never previously secured in valves of this type. The several features of the invention are fully set forth hereinafter, reference being had to the accompanying drawings, wherein—

Fig. 1 is a view in side elevation, partly in section, showing one application of the invention to a butterfly or pivoted disk valve.

Fig. 2 is a view at right angles to Fig. 1, showing certain of the parts in transverse section.

Fig. 3 is a fragmentary plan view of the valve shell or casing, with the operating mechanism removed therefrom.

Fig. 4 is a sectional view on the line 4—4 of Fig. 1.

Fig. 5 is a view similar to Fig. 1, showing a modified form of the invention.

Fig. 6 is a view at right angles to Fig. 5, showing certain of the parts in transverse section, and Fig. 7 is a sectional view on the line 7—7 of Fig. 5.

Like reference characters refer to like parts in the different figures.

Both embodiments of the invention herein illustrated provide the usual cylindrical shell or casing 1, adapted for interposition between adjacent sections of the pipe or conduit, not shown, and providing suitable flanges 1', 1' for attachment to said conduit sections. In both embodiments of the invention, the valve disk 2, of the usual stream line section, is secured to a spindle 3, the ends of which are journaled in suitable bearings 3', 3' provided by the shell or casing 1. In its full open position, the valve disk 2 is disposed axially of the shell or casing 1, as indicated by the full lines in Figs. 1 and 5; the closed position of said valve disk, as ordinarily constructed, requires a movement thereof from open position of somewhat less than ninety degrees, as indicated by the dot and dash lines in Figs. 1 and 5.

Heretofore, for the operation of such a valve disk 2, the pivotal spindle thereof has been extended through the casing, for the external attachment thereto of a crank or other operating means, by which to swing the valve from open to closed position, or vice versa, or to hold it in any desired position of adjustment. Such operation, by torsion applied to a spindle, (be it the valve spindle, or another spindle mechanically connected to said valve spindle), is in many ways disadvantageous, especially with large valves subject to heavy pressure. In the first place, there is the necessity for limiting the forces applied in accordance with the strength of the crank and the key connecting it to the spindle, as well as the torsional strength of the spindle itself. Secondly, the operating spindle must be made undesirably large in order to have sufficient torsional strength to resist the heavy unbalanced forces which are set up when the valve is partly open, with a high velocity of flow therethrough. Thirdly, in the closed position of the valve, where the portion lying down stream from the pivotal axis is subject to actual deflection or distortion by the pressure of fluid on its up stream side, as indicated by the arrows A in Figs. 1 and 5, no mere torsional force, applied to a spindle will overcome this deflection or distortion, nor will such a force eliminate the consequent leakage around the lower half of the disk. It is the aim of the present invention to overcome all of the above mentioned difficulties, and this is accomplished in the following manner:—

The valve disk 2, preferably on that portion thereof which lies down stream from the pivotal axis in the closed position of said disk, is provided with an arm or web 4, the latter being rigidly united to the disk in any well known manner, or, if desired, cast integrally therewith, as shown. A rod 5 is pivotally attached, by means of a pin 6, to the arm or web 4, and said rod, by the attachment of its free end to any suitable operating devices disposed externally of the casing 1, serves for the transmission, at the will of the operator, of the forces required to swing the valve disk 2 from open to closed position, or vice versa, or to hold it in any desired position of adjustment.

As shown in Figs. 1 and 5, the upward movement of rod 5 procures movement of the valve into open position, while a downward movement of said rod closes the valve; in any case, the shaft or spindle 3 is wholly relieved of any torsional strain incident to the movement of the valve,—said movement being accomplished by forces directly applied to the arm or web 4 through the rod 5. The last named parts can be readily made of sufficient strength to transmit the desired forces to the valve and to resist the unbalanced forces set up by a high velocity of flow through the conduit when the valve is part way open. Moreover, in the closed position of the valve, as indicated by dot and dash lines in Figs. 1 and 5, it is possible through the arm 4 and rod 5 to apply a force of sufficient magnitude and at the proper location to overcome the deflection or distortion due to pressure on the down stream half of the disk, thus eliminating the leakage that would otherwise occur in the vicinity of the arrows A. In addition, due to the wedging action between the elliptical valve disk and its circular housing, the closing force through arm 4 and rod 5 tends to draw in the sides of the housing, causing it to hug the disk, and thereby reducing the leakage, in the zone of the pivotal axis of said disk.

The application of valve moving and controlling forces to the rod 5, at the will of the operator, may be effected in any well known manner, as by the use of any suitable mechanical or hydraulic hoist or jack which is capable of developing the requisite force and which will afford positive control of the disk in all positions and under all conditions so as to render the movements of said disk completely subject to the will of the operator. As shown in Figs. 1 to 4 inclusive, the rod 5 itself passes through the casing 1 and terminates on the exterior thereof, said rod being associated directly, without the interposition of any cross head, with a mechanical hoist, as hereinafter described. The rod 5 is formed on its upper end with a thread 7 for cooperation with a nut 8 and the latter being rotatable to raise or lower said rod, either by hand or by power, through suitable gearing 9, 10. The base or frame 11 of the hoist in this construction is so disposed as to oscillate on the support afforded it by the casing or shell 1, in order to permit the directly connected rod 5 to assume the various inclinations made necessary by the circular path of its pivoted inner end; as herein shown, said hoist frame 11 is free to swing on the axis provided by trunnions 12, 12, the latter turning in bearing blocks 13, 13 which are secured by bolts 14, 14, Figs. 1 and 3, to the flat top 15 of shell 1, or to any other stationary support.

The rod 5 passes through the enlarged circular hole 16 in the top 15 of casing 1, and beyond said hole said rod works through a suitable stuffing box 17 carried internally by an inner portion 18 of the oscillatory hoist frame 11. Said inner portion 18 of the hoist frame 11 also carries externally a member 19 having a spherical surface 20 for cooperation with the edge of the circular hole 16, the latter being equipped with a cup leather 21, or other suitable packing, held in place by a ring 22. With the member 19 so adjusted that the center of its spherical surface 20 corresponds with the intersection of the axes of the trunnions 12 and rod 5, the oscillation of the hoist frame 11 can take place in the absence of leakage from the casing 1, it being understood that the stuffing box 17 prevents any leakage around the rod 5.

In the form of the invention shown in Figs. 5, 6 and 7, the rod 5 is pivotally connected at its outer end to a sliding crosshead 23, adapted to travel in a suitable guide 24 rigidly supported on the casing or shell 1 and with its interior in fluid tight connection with the interior of said casing. For the movement of rod 5 by said crosshead, any suitable means may be provided, here shown as a hydraulic cylinder 25, whose piston 26 is connected by a rod 27 with the crosshead; a stuffing box 28 surrounding piston rod 27 prevents leakage of fluid from the interior of the crosshead guide 24. Any suitable valve mechanism, such as a fourway cock 29 may be provided to control, at the will of the operator, the admission of pressure medium to one end or the other of the cylinder, to obtain any desired movement of the piston 26 for the actuation of valve disk 2.

In both forms of the invention herein illustrated, the arm or web 4 is preferably made hollow, and is rounded at its up stream and down stream edges, so that in plan, it is as indicated in Figs. 3 and 4; this offers the least possible obstruction to the flow of fluid through the valve. Also, preferably, the shell or casing 1, adjacent the passage therethrough of the rod 5, is in both forms of the invention provided with a hollow projection 30 of the same general section as the arm 4, one purpose of which is to shield the rod 5 and its associated parts when the valve is in open position.

Also in both forms of the invention, the operation of the valve is effected in the absence of any necessity for the application of torsional forces,—the employment of which for the operation of previous valves of this type has been mainly responsible for the inherent lack of strength, reliability and tightness in such valves. According to the present invention, no forces other than the forces applied in substantially rectilinear directions are required for the operation of the valve, and because of this, the operating parts, including the arm 4, rod 5 and the associated hoist, can readily be given the requisite strength to move the valve even under the most severe conditions of pressure velocity in the conduit. The direct connection between the valve and the hoist reduces vibration to a minimum during operation, and when the valve is fully open, the arm 4 is brought into positive contact with the projection 30, which latter acts as a rigid buttress and practically eliminates the vibration that would otherwise be set up by high velocity flow through the conduit.

I claim:

1. A centrally pivoted disk valve for the control of pressure fluid in a circular conduit, said valve in its closed position seating edgewise in said conduit, with a portion thereof lying down stream of its pivotal axis, said conduit serving for the conveyance of fluid under such conditions of pressure and velocity as normally to cause deflection of the periphery of said valve in said down stream portion when in closed position, in combination with operating means for said valve projecting externally of said conduit and adapted by rectilinear movement to exert a closing force directly thereon, said closing force being exerted by said operating means in a direction to effectively oppose the aforesaid peripheral deflection of said down stream portion when said valve is in closed position.

2. A centrally pivoted disk valve of the butterfly type for the control of pressure fluid in a conduit, means for procuring the opening and closing movements of said valve, at the will of an operator, by the direct transmission to a projection of said valve, from the exterior of said conduit, of forces produced by substantially rectilinear movements, in contradistinction to torsional forces, and means engaged by said valve projection, to prevent vibration of said valve in its full open position.

3. The combination with a pivoted disk valve seating edgewise in a conduit for the control of pressure fluid therein, of an arm projecting from one side of said disk, a rod connected to said arm and projecting externally of said conduit, and hoisting means operable directly on said rod for moving said disk, said hoisting means being supported for oscillatory movement to compensate for the different angular positions assumed by said rod.

4. The combination with a pivoted disk valve seating edgewise in a conduit for the control of pressure fluid therein, of an arm projecting from one side of said disk, a rod connected to said arm and projecting externally of said conduit, a hoisting means connected to said rod and adapted to partake of the angular movement thereof, said hoisting means making a joint with said conduit, and means for preventing leakage at the joint between said hoisting means and said conduit.

5. The combination with a pivoted disk valve seating edgewise in a conduit for the control of pressure fluid therein, of an arm projecting from one side of said disk, a rod connected to said arm and projecting externally of said conduit, a hoisting means connected to said rod and adapted to partake of the angular movement thereof, said hoisting means making joints with said conduit, and with said rod, and means for preventing leakage at the joint between said hoisting means and said conduit, and at the joint between said rod and said hoisting means.

6. The combination with a centrally pivoted disk valve of the butterfly type for the control of pressure fluid in a conduit, of an arm projecting from the down stream side of said disk, a member connected to said arm and extending through a wall of said conduit, means for imparting substantially rectilinear movement to said member, for the transmission to said arm, at the will of an operator, of the forces required for the movement of said disk, and means engaged by said arm in the full open position of the disk, to prevent the latter's vibration.

EDWIN A. DOW.